United States Patent
Li et al.

(10) Patent No.: US 7,613,135 B2
(45) Date of Patent: Nov. 3, 2009

(54) SYSTEM AND METHOD FOR ROUTING PACKET TRAFFIC

(75) Inventors: Guangzhi Li, Kearny, NJ (US); Robert Duncan Doverspike, Tinton Falls, NJ (US); Dongmei Wang, Kearny, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 422 days.

(21) Appl. No.: 11/549,329

(22) Filed: Oct. 13, 2006

(65) Prior Publication Data

US 2008/0089335 A1 Apr. 17, 2008

(51) Int. Cl.
- H04L 12/28 (2006.01)
- H04J 3/26 (2006.01)
- H04L 12/42 (2006.01)

(52) U.S. Cl. .................. 370/258; 370/390; 370/392; 370/403; 370/432

(58) Field of Classification Search .................. 370/258, 370/390, 403, 432
See application file for complete search history.

(56) References Cited

U.S. PATENT DOCUMENTS

| | | | |
|---|---|---|---|
| 6,917,983 B1 * | 7/2005 | Li | 709/238 |
| 2002/0141345 A1 * | 10/2002 | Szviatovszki et al. | 370/238 |
| 2003/0231588 A1 | 12/2003 | Roth et al. | |
| 2005/0235227 A1 * | 10/2005 | Martineau et al. | 715/855 |
| 2006/0126556 A1 * | 6/2006 | Jiang et al. | 370/328 |
| 2007/0133484 A1 * | 6/2007 | Albal et al. | 370/338 |
| 2007/0195777 A1 * | 8/2007 | Tatar et al. | 370/392 |

OTHER PUBLICATIONS

Zhu et al., "Multicast With Network coding in Application-Layer Overlay Networks", IEEE Journal on Selected Areas in Communications, vol. 22, No. 1. Jan. 2004, pp. 107-120. (XP011105205).

Wang et al., "IGP Weight Setting in Multimedia IP Networks", Infocom 2007, 26th IEEE International Conference on Computer Communications. May 2007, pp. 2566-2570. (XP031093858).

* cited by examiner

*Primary Examiner*—Alpus H Hsu
*Assistant Examiner*—Saad Hassan
(74) *Attorney, Agent, or Firm*—Akerman Senterfitt; Ed Guntin; Pablo Meles (57) ABSTRACT

A system and method for routing packet traffic is disclosed. A system that incorporates teachings of the present disclosure may include, for example, a router having a routing element that routes packet traffic according to Internal Gateway Protocol (IGP) weights that prevent multicast packet traffic and unicast packet traffic from occupying a common unidirectional link. Other embodiments are disclosed.

17 Claims, 6 Drawing Sheets

Graph G

Empty

Remaining Network

FIG. 6

Graph G | Remaining Network

Graph G | Remaining Network

Multicast tree

Unicast tree

FIG. 13  1300

SYSTEM AND METHOD FOR ROUTING PACKET TRAFFIC

FIELD OF THE DISCLOSURE

The present disclosure relates generally to packet switched networks, and more specifically to a system and method for routing packet traffic.

BACKGROUND

As telecom operators build new networks to roll out IPTV services, they face challenges for ensuring quality of service (QoS) and quality of experience (QoE). Live TV is a real-time service that is very sensitive to packet delay, jitter, and loss. In addition, to compete with traditional satellite or cable TV services, an IPTV network should at least match the QoE the video receivers of traditional broadcast TV. Service providers also face challenges in supporting unicast services such as video-on-demand (VoD) and multicast services such as IPTV in the same network.

A need therefore arises for a system and method for routing packet traffic in such networks.

DETAILED DESCRIPTION

Embodiments in accordance with the present disclosure provide a system and method for routing packet traffic.

In a first embodiment of the present disclosure, a computer-readable storage medium in a Network Management System (NMS) can have computer instructions for assigning Internal Gateway Protocol (IGP) weights to a topology of communication links coupled to routing nodes in a Packet-Switched Network (PSN) to prevent multicast packet traffic and unicast packet traffic from occupying a common unidirectional communication link.

In a second embodiment of the present disclosure, a router can have a routing element that routes packet traffic according to Internal Gateway Protocol (IGP) weights that prevent multicast packet traffic and unicast packet traffic from occupying a common unidirectional link.

In a third embodiment of the present disclosure, a method can have the step of preventing multicast and unicast packet traffic in a Packet-Switched Network (PSN) from occupying a common unidirectional communication link by manipulating routing weights.

Figure 1:
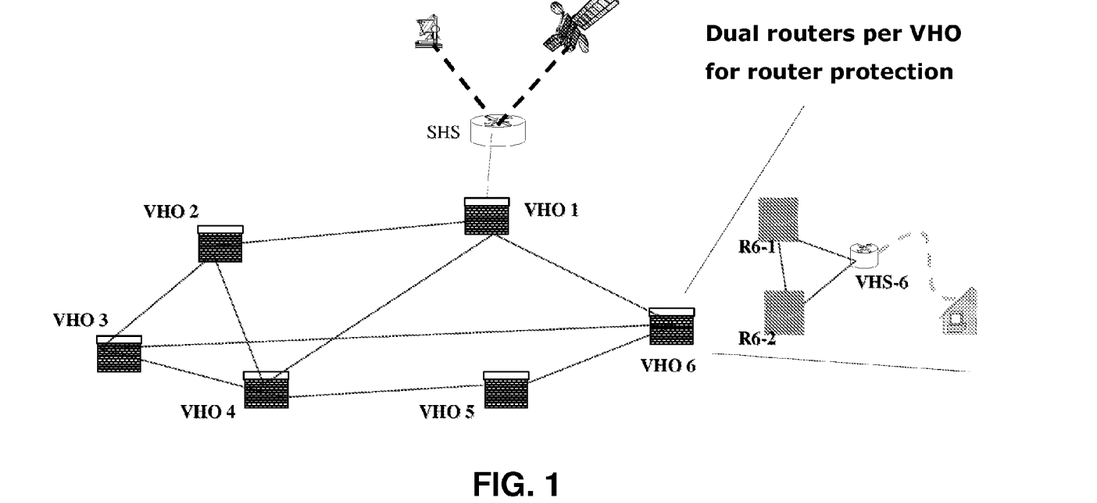
FIG. 1 depicts an exemplary embodiment of an IPTV network.

FIG. 1 depicts an exemplary embodiment of an IPTV network. In a typical IPTV backbone, there is at least one super head office server (SHS), which receives national TV channels from satellite and media servers from different media service providers, and digitizes the received contents into IP packets. The SHS server forwards the IP packets to video head servers (VHS) according to a multicast structure. The VHS then distributes video contents to video receivers. Normally a VHS serves a specific metro area. To provide fast failover for router faults, each video head office (VHO) or a super head office (SHO) installs two backbone routers. These two backbone routers connect to each other and also connect to the VHS (or super head server-SHS). In the event of a router failure, the VHS remains connected to the network by way of the backbone router.

The links between VHOs can be hardwired Dense Wavelength Division Multiplexing (DWDM) connections. The routers support multicast routing functionalities according to an IP multicast routing protocol such as a Protocol Independent Multicast with Dense Mode (PIM-DM) or Source Specific Mode (PIM-SSM). The PIM protocol builds the multicast tree based on an Internal Gateway Protocol (IGP) routing table using a reverse path forwarding (RPF) technique. The present disclosure utilizes open shortest path first (OSPF) as an IGP derivative for computing routes in a PSN.

IPTV service traffic flow is unidirectional from an SHS to video receivers along a multicast tree. Although most unicast services are bidirectional, the amount of traffic flow from a unicast server to a corresponding receiver tends to dominate upstream unicast traffic. When multicast and unicast servers collocate in the same office with default OSPF weight settings assigned to each communication link, the multicast and unicast traffic flows from these servers can traverse the same shortest routes in the same direction on the same link. Overlapping multicast and unicast traffic results in an inefficient use of bandwidth throughout a network.

Figure 2:
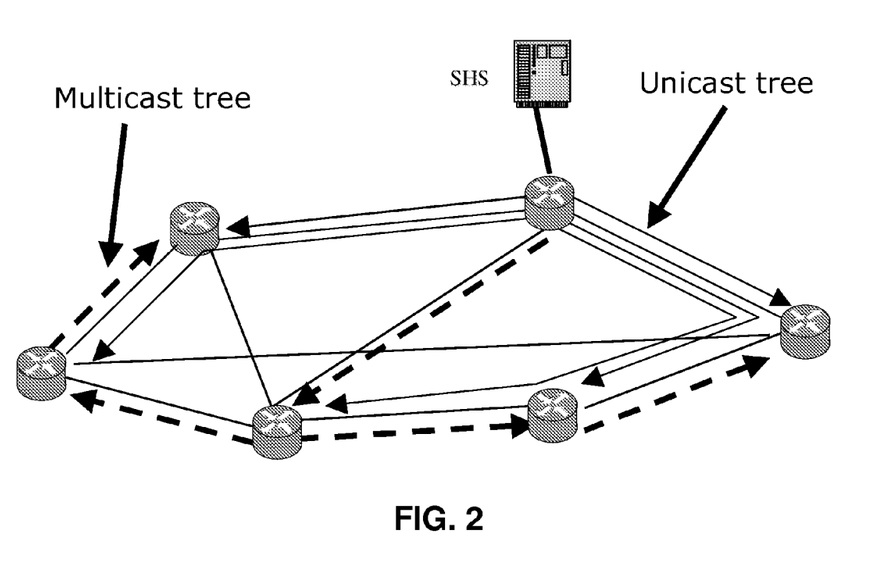
FIG. 2 depicts an exemplary embodiment of multicast and unicast trees.
Figure 3:
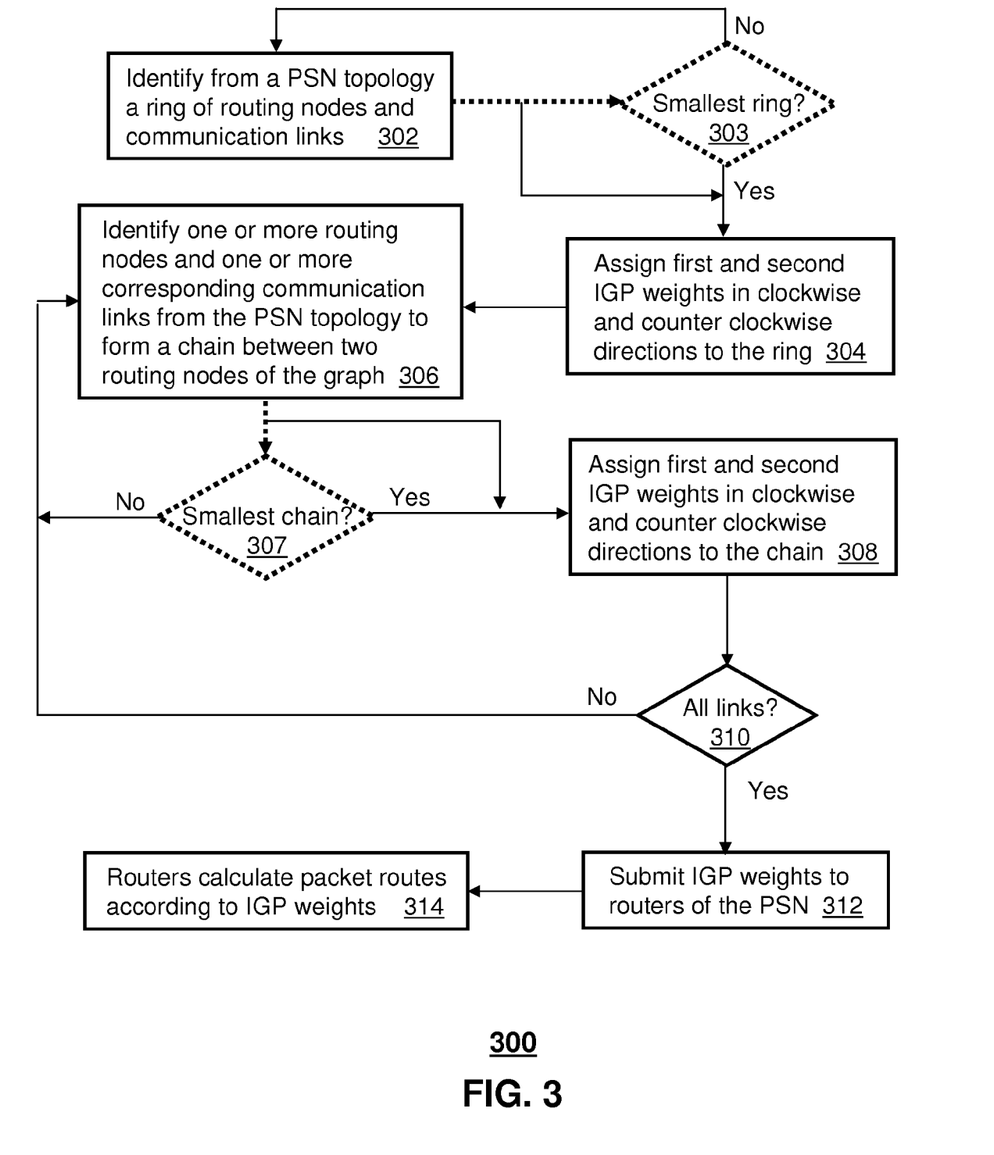
FIG. 3 depicts an exemplary method operating in portions of a Packet-Switched Network (PSN)

The present disclosure presents a method 300 depicted in FIG. 3 for tuning IGP weights assigned to communication links to prevent overlap between multicast and unicast trees as shown in FIG. 2. A graph G is said to be k-connected if there does not exist a set of k−1 vertices whose removal disconnects the graph, i.e., the vertex connectivity of G is >=k. Accordingly, a connected graph is 1-connected, and a biconnected graph is 2-connected.

It can be shown that for any network topology with an at least 2-connected graph with a source S, method 300 can assign IGP weights to communication links such that a multicast tree from S to all other nodes and a unicast tree (i.e., all unicast paths from source to receivers forming a tree rooted at the source) from S to all other nodes do not overlap, i.e., unicast and multicast traffic flow does not flow in the same direction on the same communication link.

Figure 4:
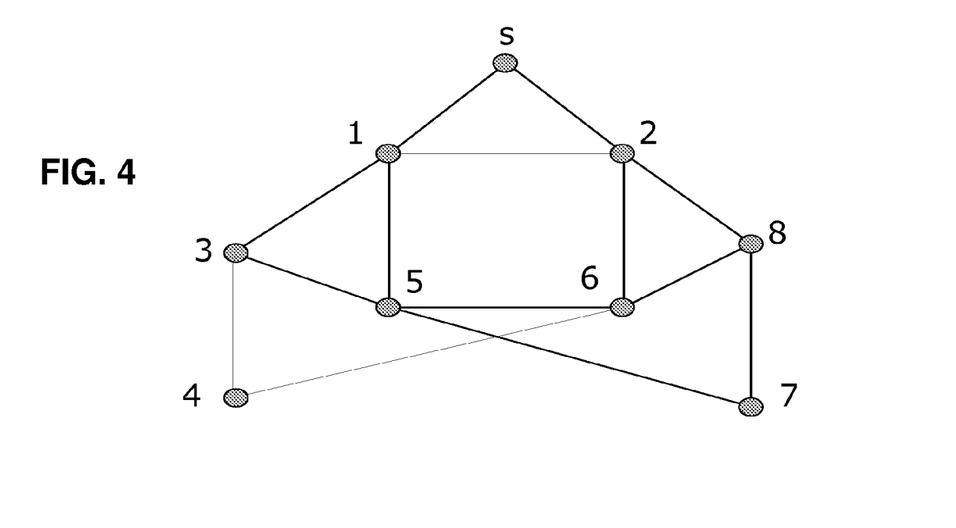
FIG. 4 depicts an exemplary embodiment of a PSN topology.
Figure 5:
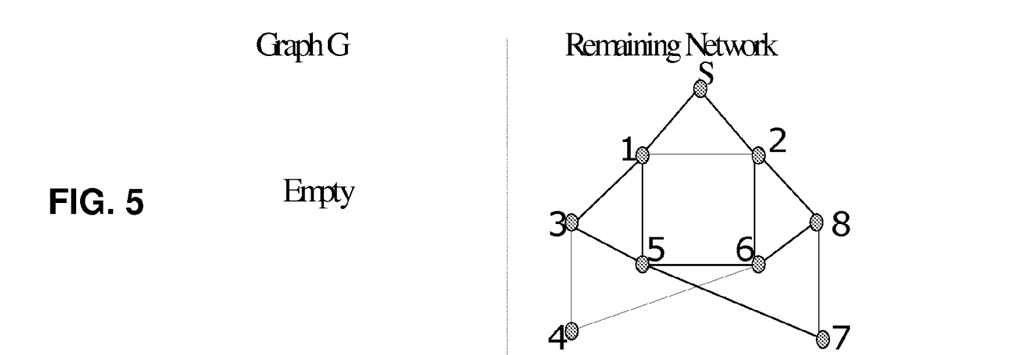
FIGS. 5-10 depict exemplary steps for assigning Internal Gateway Protocol (IGP) weights to communication links of the PSN.
Figure 6:
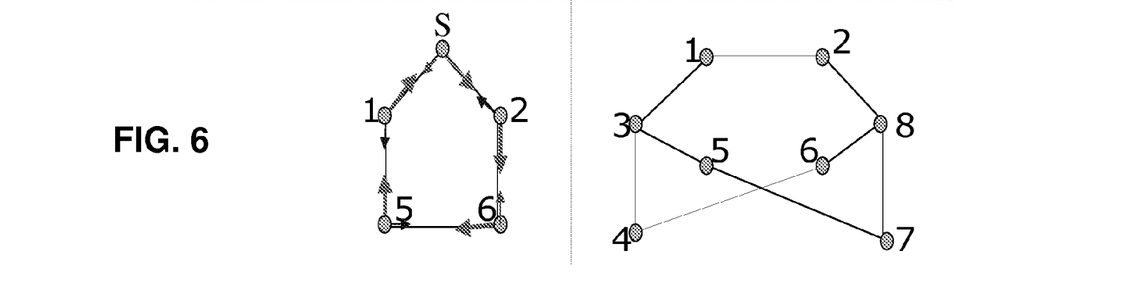

For illustration purposes, method 300 is applied to a PSN topology with 9 routing nodes and 14 communication links as depicted in FIG. 4. FIGS. 5-10 depict exemplary steps resulting from an application of method 300. Method 300 begins with step 302 in which a system such as, for example, a Network Management System (NMS) identifies from the PSN of FIG. 5 a ring of routing nodes and communication links. The ring includes a source (S) such as a multicast or unicast server. In the present illustration, a ring topology of S-1-5-6-2-S is chosen by the NMS as shown in FIG. 6. Based on one or more optimization objectives used by the NMS other ring topologies such as S-1-2-S can be chosen as a starting point.

Once a ring is selected, the NMS proceeds to step 304 where it assigns first and second IGP weights to the communication links in clockwise and counterclockwise directions respectively. The first IGP weight can represent a low IGP weight assignment for unicast traffic, while the second IGP weight can represent a high IGP weight assignment for multicast traffic. Thin and short arrows represent the low IGP weight, and thick and long arrows represent a high IGP weight. The outcome of steps 302 and 304 is illustrated in FIG. 6, which shows a first instantiation of graph G with routing nodes and communication links with assigned IGP weights on the left, and links without assigned IGP weights on the right.

Figures 7, 8:
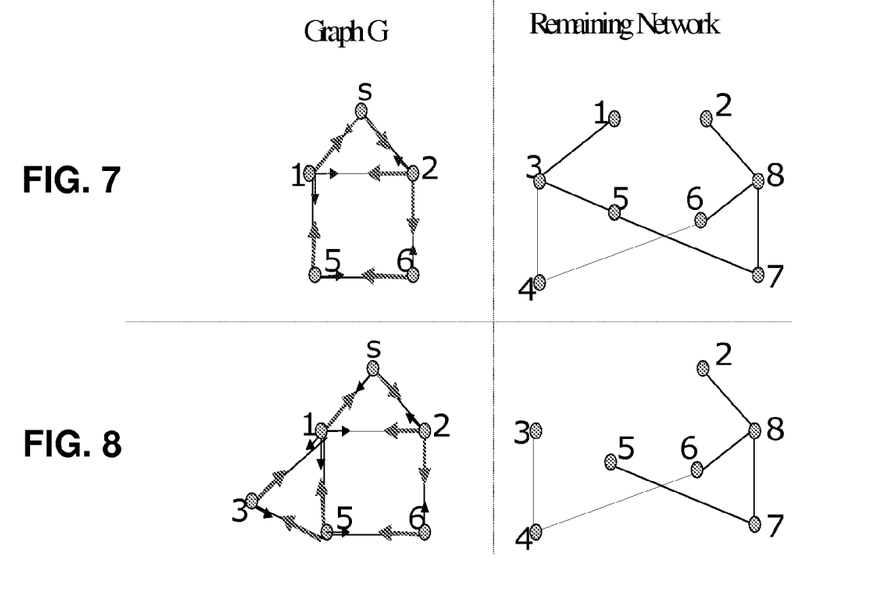

In step 306 the NMS identifies one or more routing nodes and one or more corresponding communication links from the remaining portion of the PSN topology (routing nodes 1-8) to form a chain between two routing nodes of graph G. Starting from node 1, a set of communication links of the PSN is selected by the NMS to form a chain that terminates on graph G. A first iteration of a chain selection is depicted in FIG. 7. The chain selected corresponds to link 1-2. Since node 2 is already on graph G, link 1-2 forms a chain. In step 308, the NMS assigns to the selected chain the low and high IGP weights discussed earlier in clockwise and counterclockwise directions as was done for the ring. The selected chain expands graph G to include link 1-2. It should be noted that the selection of a chain can take place from any node on graph G. Communication links continue to be selected until a new chain touches the graph G.

In step 310, the NMS checks if there are remaining communication links with unassigned IGP weights, if there are it repeats steps 306 and 308 until all the communication links and corresponding routing nodes have been processed. Accordingly in another iteration the NMS identifies that node 1 has one more link left without an IGP weight assignment. Starting from node 1, the NMS selects link 1-3. Since node 3 is not on the graph G, the NMS also selects link 3-5. The NMS at this point detects a chain 1-3-5 since node 5 is already on graph G. The NMS assigns links along the direction 1-3-5 a low IGP weight and links along the direction 5-3-1 a high IGP weight. The NMS at this point expands graph G to include the links on the chain 1-3-5 as depicted by FIG. 8.

Figure 9:
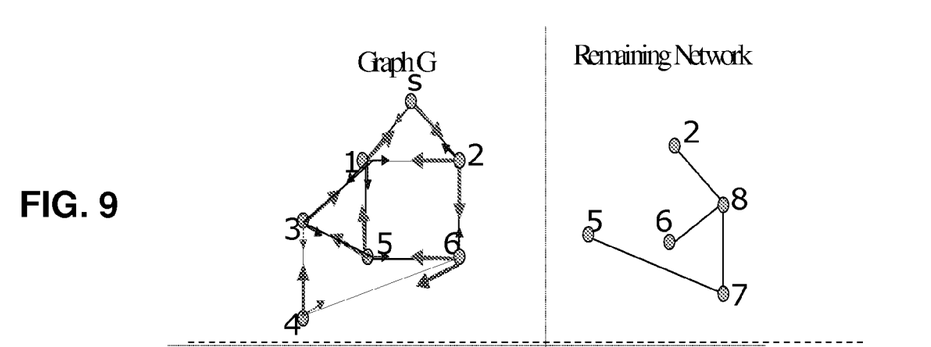

After finishing with node 1, the NMS moves to node 3. At node 3, there is one link 3-4 without IGP link weights. Since node 4 is not on graph G, the NMS selects link 4-6. Since node 6 is on graph G, the NMS detects a chain 3-4-6. The NMS then assigns IGP link weights along 3-4-6 with a low IGP weight and along 6-4-3 with high IGP weight. The NMS expands the graph G to include the new added links as depicted in FIG. 9.

Figure 10:
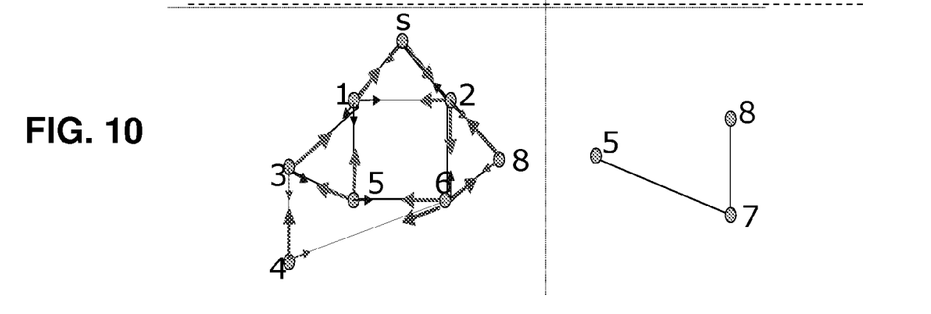

The NMS continues to repeat steps 306 and 308 for the remaining unassigned links. In the next iteration, the NMS looks at node 2 and finds link 2-8, which has not been assigned an IGP link weight. Since node 8 is not on graph G, the NMS detects two links 8-6 and 8-7 that it can choose. Since node 6 is already on graph G, links 2-8-6 form a chain back to graph G. Alternatively, the NMS can choose link 8-7, and continue to add more links to form a chain back to graph G. Assuming the NMS selects link 8-6, it assigns IGP link weights on links of the chain 2-8-6 with a low IGP weight and along direction 6-8-2 with high IGP weight. The NMS expands graph G to include the new chain 2-8-6 as depicted in FIG. 10.

Figure 11:
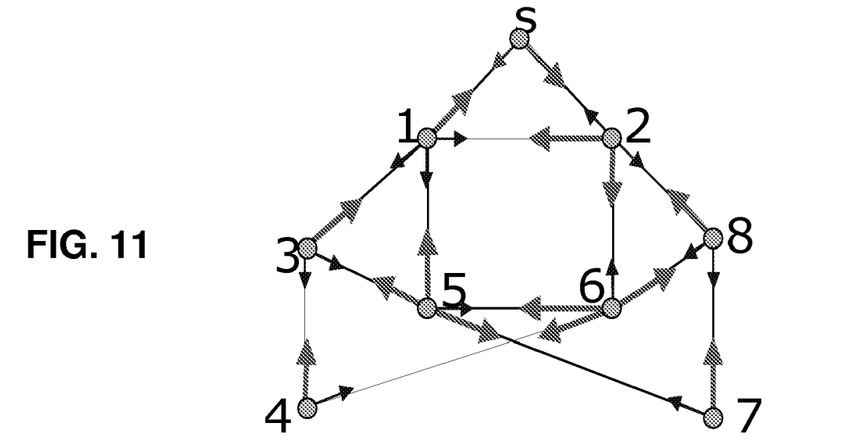
FIGS. 11-12 depict exemplary embodiments of the PSN topology after assigning IGP weights to all communications links in said topology.
Figure 12:
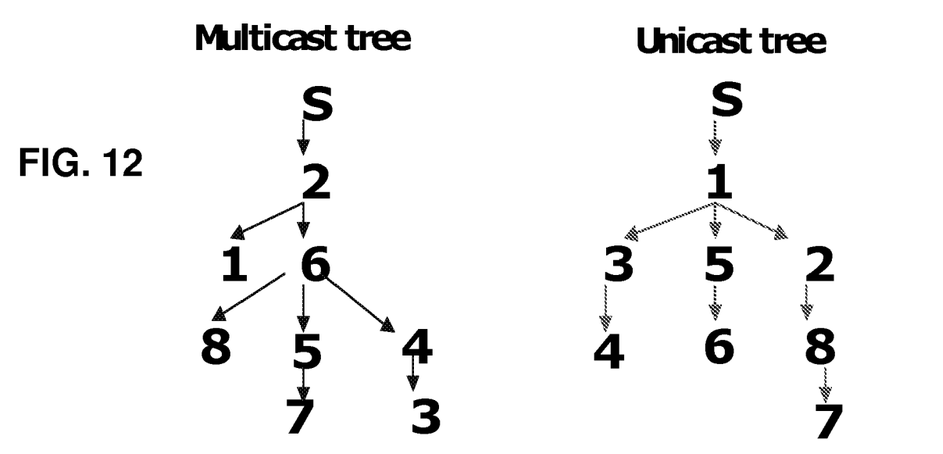

Again, the NMS detects in step 310 that is not finished processing the PSN. In a final iteration, the NMS identifies a remaining chain 5-7-8 that terminates at node 5 and node 8 on graph G. The NMS assigns links on the chain along 8-7-5 as a low IGP weight and along 5-7-8 as high IGP weight. The final graph G is depicted in FIG. 11. With all links of the PSN assigned IGP weights, the generated multicast and unicast trees from source S are depicted in FIG. 12. The NMS can be programmed after completing the last iteration of step 310 to present a Graphical User Interface (GUI) that depicts of FIGS. 11-12. The NMS can also be programmed between iterations to present one or more GUIs for the FIGS. of 4-10. The multicast and unicast trees shown in FIG. 12 do not have a common unidirectional link. Hence method 300 has achieved the goal of assigning IGP weights that prevent multicast and unicast trees from overlapping.

Once IGP weights have been assigned, the NMS can be programmed to proceed to step 312 where it submits said weights to all routers of the PSN, thereby directing said routers to calculate and distribute in step 314 multicast and unicast traffic as depicted in FIG. 12.

In a supplemental embodiment, method 300 can include steps to minimize multicast delay and link bandwidth. To minimize multicast delay, the NMS needs to minimize a distance from a multicast server to each receiver. To accomplish this, the NMS can be programmed in step 303 to select a ring with minimal hops from a source S by calculating the shortest path hops from each routing node adjacent to the source S, and then comparing a sum of the shortest hops for the adjacent routing nodes until a smallest ring is identified. Once such a ring is identified, the NMS proceeds to step 304 as described earlier.

Method 300 applies IGP weights so that multicast and unicast traffic flows in opposite directions. Bandwidth utilization on a communication link can be determined from an amount of traffic flow in each direction. The bandwidth requirements on communication links along a multicast tree can be considered constant. However, the bandwidth requirement on communication links along a unicast tree varies according to a sum of all unicast bandwidth requests from downstream routing nodes along the unicast tree.

To reduce link bandwidth utilization of unicast traffic, the NMS can be programmed in step 307 to diversify the unicast routes as much as possible so as to balance bandwidth utilization by said traffic throughout a PSN. This can be accomplished by maximizing the number of tree branches at the unicast tree root (unicast server) as the unicast tree is expanded by selecting the shortest chains possible using a heuristic method such as a breadth first search algorithm described in T. Cormen, C. Leiserson, and R. Rivest, "Introduction to Algorithms, (Chapter VI)" McGraw-Hill Edition, $16^{th}$ printing, 1996, of which relevant portions are expressly incorporated herein by reference in its entirety. By selecting shorter chains, the number of branches in the unicast tree is increased, which in turn diversifies the unicast tree and reduces bandwidth usage on a per link basis. This step also has the effect of reducing multicast delay.

The present disclosure is applicable to any multicast application and IGP routing protocols utilizing a reverse path forwarding technique with an IGP unicast routing protocol that conforms to shortest path routing. For example, Distance Vector Multicast Routing Protocol (DVMRP) is a multicast routing protocol which builds its own multicast trees, and does not depend on the unicast routing protocol. Since the DVMRP advertises a distance from each router to the multicast source, the resulting multicast tree is a shortest path tree from the receivers to the multicast source. Accordingly, the multicast tree can be separated from the unicast trees with the IGP weighting method described in the present disclosure.

The techniques presented by method 300 for preventing the overlap of unicast and multicast traffic can be used to create additional network capacity which service providers can readily use to expand services (e.g., IPTV) and improve revenue.

From the foregoing descriptions, it would be evident to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

Figure 13:
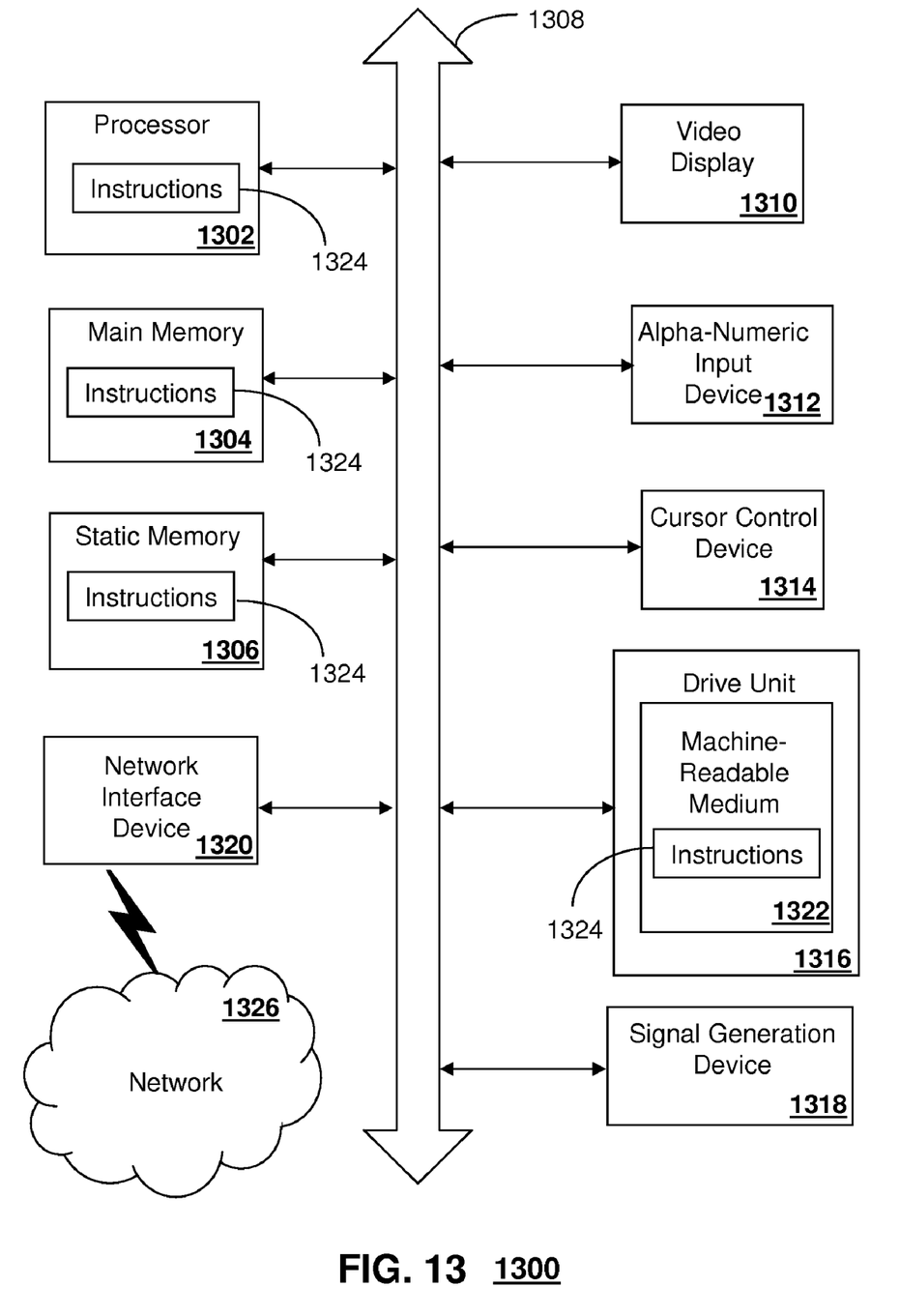
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium in a Network Management System (NMS), comprising computer instructions for assigning Internal Gateway Protocol (IGP) weights to a topology of communication links coupled to routing nodes in a Packet-Switched Network (PSN) to prevent multicast packet traffic and unicast packet traffic from occupying a common unidirectional communication link, wherein different weights are iteratively assigned to the routing nodes in a PSN ring depending on their relation to a source node being either in a clockwise direction or a counter-clockwise direction until all nodes on the PSN are an integral part of a graph.

2. The storage medium of claim 1, comprising computer instructions for:
   assigning a first IGP weight to communication links carrying multicast packet traffic; and
   assigning a second IGP weight to communication links carrying unicast packet traffic.

3. The storage medium of claim 2, wherein one of the first and second IGP weight exceeds the other.

4. The storage medium of claim 1, wherein IGP conforms to one among Open Shortest Path First (OSPF), Intermediate System-Intermediate System (IS-IS) protocol, and Distance Vector (DV) routing protocol standards.

5. The storage medium of claim 1, comprising computer instructions for:
   identifying from the topology of the PSN a ring of routing nodes and corresponding communication links;
   assigning a first IGP weight to communications links of the ring in a clockwise direction;
   assigning a second IGP weight to communications links of the ring in a counterclockwise direction, thereby forming the graph;
   identifying one or more routing nodes and one or more corresponding communication links from the topology of the PSN, excluding those already part of the graph, that form a chain between two routing nodes of the graph;
   assigning the first IGP weight to communication links of the chain in the clockwise direction;
   assigning the second IGP weight to communications links of the chain in the counterclockwise direction, thereby expanding the graph; and
   repeating the foregoing steps after the first instantiation of the graph until all routing nodes and corresponding communication links in the PSN become an integral part of the graph.

6. The storage medium of claim 5, wherein one of the routing nodes of the ring comprises a source routing node.

7. The storage medium of claim 5, comprising computer instructions for selecting the ring with a minimum ring size.

8. The storage medium of claim 5, comprising computer instructions for selecting each chain with a minimum chain size.

9. The storage medium of claim 6, wherein the source routing node comprises a unicast server, and wherein the storage medium comprises computer instructions for selecting one or more chains that increase diversification of unicast traffic supplied by the unicast server.

10. The storage medium of claim 6, comprising computer instructions for selecting each chain according to a breadth first search method.

11. The storage medium of claim 1, comprising computer instructions for presenting a Graphical User Interface (GUI) representing at least one among a resultant topology of communication links coupled to routing nodes of the PSN with unicast and multicast packet traffic routing indications, a multicast topology from the resultant topology, and a unicast topology from the resultant topology.

12. A router, comprising a routing element that routes packet traffic according to Internal Gateway Protocol (IGP) weights that prevent multicast packet traffic and unicast packet traffic from occupying a common unidirectional link, wherein the routing element receives from a Network Management System (NMS) the IGP weights corresponding to a topology of communication links coupled to routers in a Packet-Switched Network (PSN) from which the router operates and the NMS assigns a first IGP weight to communication links carrying multicast packet traffic, and assigns a second IGP weight to communication links carrying unicast packet traffic; and
   wherein the NMS identifies from the topology of the PSN a ring of routers and corresponding communication links, assigns a first IGP weight to communications links of the ring in one direction, assigns a second IGP weight to communications links of the ring in an opposite direction, thereby forming a graph, identifies one or more routing nodes and one or more corresponding communication links from the topology of the PSN, excluding those already part of the graph, that form a chain between two routing nodes of the graph, assigns the first IGP weight to communication links of the chain in the one direction, assigns the second IGP weight to communications links of the chain in the opposite direction, thereby expanding the graph, and repeats the foregoing steps after the first instantiation of the graph until all routing nodes and corresponding communication links in the PSN become an integral part of the graph.

13. The router of claim 12, wherein one of the routers of the ring comprises a source routing node for transporting one among unicast and multicast packet traffic.

14. The router of claim 12, wherein the NMS selects the ring with a minimum ring size.

15. The router of claim 12, wherein the NMS selects each chain with a minimum chain size.

16. The router of claim 12, wherein the NMS selects one or more chains that increase diversification of unicast traffic supplied by a unicast server.

17. A method, comprising preventing multicast and unicast packet traffic in a Packet-Switched Network (PSN) from occupying a common unidirectional communication link by manipulating routing weights, wherein the routing weights conform to an Internal Gateway Protocol (IGP), and wherein the method comprises:

identifying from the topology in the PSN a ring of routing nodes and corresponding communication links;

assigning a first and second IGP weights to communications links of the ring in clockwise and counterclockwise directions;

identifying one or more routing nodes and one or more corresponding communication links from the topology of the PSN, excluding those already part of a graph, that form a chain between two routing nodes of the graph;

assigning the first and second IGP weights to communication links of the chain in clockwise and counterclockwise directions; and repeating the foregoing steps after the first instantiation of the graph until all routing nodes and corresponding communication links in the PSN become an integral part of the graph.

\* \* \* \* \*